(12) United States Patent
Fujino

(10) Patent No.: US 7,234,499 B2
(45) Date of Patent: Jun. 26, 2007

(54) ADHESIVE TAPE APPLICATION TOOL

(75) Inventor: Takayoshi Fujino, Kanagawaa (JP)

(73) Assignee: 3M Innovative Properties Company, St. Paul, MN (US)

( * ) Notice: Subject to any disclaimer, the term of this patent is extended or adjusted under 35 U.S.C. 154(b) by 112 days.

(21) Appl. No.: 10/510,671

(22) PCT Filed: Mar. 27, 2003

(86) PCT No.: PCT/US03/09263

§ 371 (c)(1),
(2), (4) Date: Oct. 6, 2004

(87) PCT Pub. No.: WO03/091139

PCT Pub. Date: Nov. 6, 2003

(65) Prior Publication Data

US 2005/0230053 A1     Oct. 20, 2005

(30) Foreign Application Priority Data

Apr. 25, 2002 (JP) .............................. 2002-123403

(51) Int. Cl.
*B32B 39/00* (2006.01)
*B29C 65/48* (2006.01)
*B65H 29/20* (2006.01)

(52) U.S. Cl. ...................... 156/391; 156/538; 156/556; 156/574

(58) Field of Classification Search ................ 156/391, 156/538, 556, 574
See application file for complete search history.

(56) References Cited

U.S. PATENT DOCUMENTS 6,098,685 A     8/2000     Maeda 6,508,287 B1 *  1/2003     Shinozaki et al. .......... 156/391

(Continued)

FOREIGN PATENT DOCUMENTS

JP     2000159212 A  *  6/2000

(Continued)

OTHER PUBLICATIONS

English Machine Translation of JP 2000-159212.*

(Continued)

*Primary Examiner*—Chris Fiorilla
*Assistant Examiner*—Sing P. Chan
(74) *Attorney, Agent, or Firm*—Harold C. Knecht, III

(57) ABSTRACT

An adhesive tape application tool (1) usable for applying an adhesive tape to a door sash frame (80) of a vehicle, for example, quickly without causing bubbles incorporated or without deviation of tape applying positions even if the door sash has a form of a curve with a small radius or curves steeply with a corner. The adhesive tape application tool includes: an application part (5) for pressing an adhesive tape against an application surface (54), and a guidance part (6) having three guide rollers (16, 17) having a tapered shape portion and being in contact with the projected line portion in such a manner that the guide rollers pinch the adherend together with the application part. The guidance part is provided with guide rollers having a tapered shape portion positioned at both ends being installed with their top directed in one direction, and the central guide roller having a tapered shape portion being installed with its top directed in other direction (opposite to the aforementioned direction).

16 Claims, 7 Drawing Sheets

U.S. PATENT DOCUMENTS 6,585,023 B2    7/2003   Azuhata
6,601,630 B2 *   8/2003   Kang ........................ 156/574
6,748,993 B1 *   6/2004   Shinozaki et al. .......... 156/391
6,796,351 B1 *   9/2004   Maeda ...................... 156/391

FOREIGN PATENT DOCUMENTS

JP           2001097636 A   *   4/2001
JP           2001-123127        5/2001
WO       WO 01/25077 A1   *   4/2001

OTHER PUBLICATIONS

English Abstract of JP 2000-159212.*

* cited by examiner

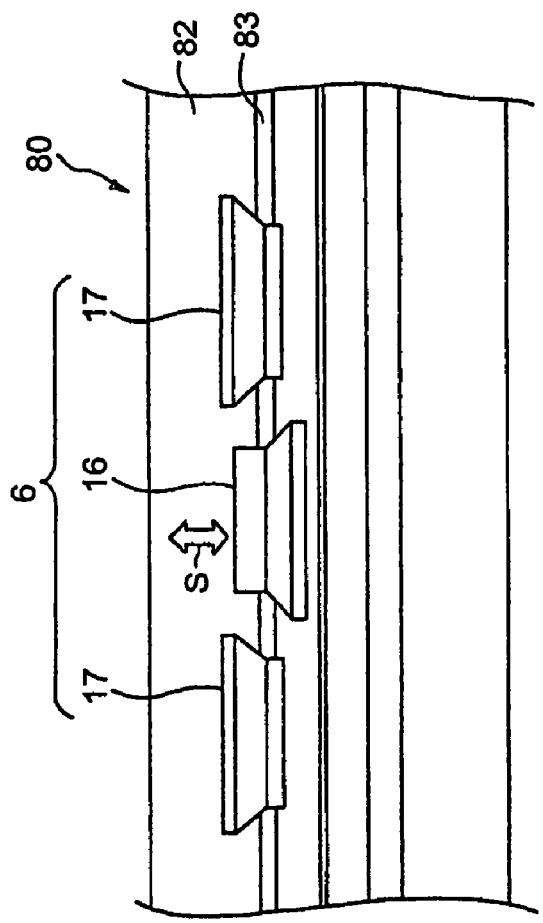
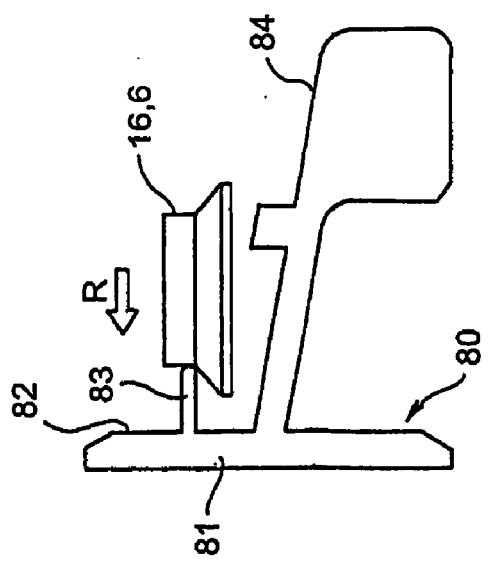

ADHESIVE TAPE APPLICATION TOOL

FIELD OF THE INVENTION

The present invention relates to methods and apparatus for applying an adhesive tape, particularly, an adhesive tape application tool and, more particularly, an adhesive tape application tool being usable when an adhesive tape is applied to an adherend having a projected line portion on the surface opposite to the application surface of the adhesive tape.

BACKGROUND OF THE INVENTION

A thin film is caused to adhere to the surface of an article to provide the article with a favorable design or to add some function to the article. For example, a colorful film imitating stained glass or a nontransparent film to protect privacy may be caused to adhere to a transparent window of a building, or a UV ray shielding film is caused to adhere to vehicle windows to protect the skin of passengers and drivers. Because applying film to an article can protect the surface from air (oxygen), applying films instead of providing a coating is favorably accepted.

It is well known in the art that neatly applying a thin film onto the surface of an article is difficult. One reason is a difficulty in precisely positioning the film on the article. Another reason is invasion of air between the article and the film. The air may remain as bubbles after applying the film, resulting in an unfavorable appearance. If the application job is not quickly completed, a line mark (a shock line) may be formed in the area in which the application job is suspended, and this would result in impairing the external appearance. In the case where a film has an adhesive layer on the side contacting an article, the film must be so positioned that the adhesive does not come into contact with an application surface to maintain the adherence of the film to the article for a long period of time. This requirement increases the difficulty of the job for neatly and accurately applying the film to an article.

For instance, some automobile assembly lines have a step of applying a thin film (e.g., a narrow width paint replacement film) onto the surface of the automobile. More specifically, for example, in a door sash frame 80 of a vehicle shown in FIG. 9, a black adhesive tape (i.e., an adhesive-backed paint replacement film) is applied to improve the design of the vehicle by making the window outline of the door black. The black adhesive tape, for example, comprises a film layer (made of vinyl chloride, for example) as a substrate and an adhesive layer (an acrylic-type pressure sensitive adhesive, for example) provided on the back side of the film layer. In the past, the door sash frame 80 was colored with a conventional coating of paint. However, a coating operation increases the environmental load due to splashing of solvent and liquid waste therefrom and requires a considerable number of process steps and a significant operation cost. For these reasons, an adhesive-backed tape having a colored film layer (i.e., an adhesive-backed paint replacement film) has become more popular in recent years.

A seam impairs the appearance when a black adhesive tape is applied along the door sash frame of a vehicle. Therefore, in the case where the door sash has a contour figuring a curve in a conspicuous position, a piece of long tape is preferably applied along the area including the curve. The curve herein refers to a curve 91 of a door sash frame 80 of a vehicle shown in FIG. 9, for example.

However, when an adhesive tape is applied along the door sash frame of a vehicle, the application operation may not follow a curve in the door sash frame. The adhesive tape may deviate from the application surface, requiring that the application operation be carried out again from the beginning. There is another problem that a long period of time is required for an adhesive tape application operation because the adhesive tape cannot be properly positioned on curved lines in a short time. Because all these problems decrease productivity and increase costs, improvement of technologies has been desired.

Tools useful for applying an adhesive tape have been proposed to solve these problems.

For example, Japanese Patent Application Laid-open No. 123127/2001 proposes an adhesive tape application tool shown in FIG. 3, which is capable of consistently and precisely applying an adhesive tape at high speed. The adhesive tape application tool 101 applies an adhesive tape with a release paper to a door sash frame 80 while removing the release paper by causing the tool to move along a door sash frame 80 of a vehicle. The adhesive tape can be applied without bubbles included therein because the tool is provided with an elastic roller 105 which presses the adhesive tape against the tape-applying surface of the door sash frame 80. In addition, a guide roller 106 with a concave groove 116 is formed on the back of the tape applying surface of the door sash frame 80. The guide roller 106 engages a projected line portion 83 (convex) extending longitudinally along the door sash frame 80, whereby high precision positioning can be ensured. The tool can accurately apply an adhesive tape in this manner.

However, many vehicle designers in recent years prefer a curve with a small radius for a door sash configuration or a curved configuration with a corner rather than a smooth curve. This inevitably requires the projected line portion 83 (convex) extending longitudinally along the door sash frame 80 to also be formed with a steep curve or a corner. In such an instance, a guide roller 106 with a concave groove 116 can engage the projected line portion 83 (convex) at the curve of the door sash frame 80 due to an inside-outside ring difference. As a result, if the adhesive tape is applied at a stretch, deviation of the adhesive tape may occur in the curve; or, if the tool is caused to travel slowly in the curve to avoid derailing the guide roller 106 with a concave groove 116 from the projected line portion 83 (convex line), the adhesive tape may include bubbles which result in a shock line.

SUMMARY OF THE INVENTION

The present invention has been completed in view of the above situation and has an object of providing an adhesive tape application tool being usable for applying an adhesive tape, for example, to a door sash frame of a vehicle, quickly without causing bubbles incorporated or without deviation of tape applying positions even if the door sash has a form of a curve with a small radius or curves steeply with a corner.

In view of the situation in which an adhesive tape application operation is becoming difficult due to changing designs for the vehicle's door sash configuration and the demand of customers for details in the appearance of vehicles is stringent, forbidding seams of adhesion tapes in the conspicuous area, the present inventors have conducted extensive studies for the development of an adhesive tape application tool to apply an adhesive tape on an adherend having a long and narrow application surface and a projected line portion on the back of the application surface. As a result, the inventors have achieved this object by the following means.

Specifically, the present invention provides an adhesive tape application tool for applying a long adhesive tape to an adherend having a long application surface and a projected line portion formed on the back of the application surface in the longitudinal direction of the application surface. The adhesive tape application tool comprises an application part for pressing an adhesive tape against the application surface and a guidance part comprising three guide rollers (e.g., mountain type guide rollers) having a tapered shape portion, and being in contact with the projected line portion in such manner that said guide rollers pinch the adherend together with the application part, wherein the guidance part is provided with the guide rollers having a tapered shape portion positioned at both ends being installed with their top directed in one direction, and the other guide roller having a tapered shape portion (the central one) being installed with its top directed in the other direction.

In the present invention, the central guide roller having a tapered shape portion is preferably installed swingably in the direction of the central axis. In other words, the guide roller having a tapered shape portion is preferably installed with some allowance. In addition, it is preferable that the adherend is pinched with resilience by the application part and guidance part, and an opening and closing means for disengaging the application part and guidance part from the adherend is provided.

BRIEF DESCRIPTION OF THE DRAWINGS

FIG. 2(a) to 2(c) show one embodiment of the adhesive tape application tool of the present invention, wherein FIG. 2(a) is a top view, FIG. 2(b) is a side view, and FIG. 2(c) is a front view.

FIGS. 6(a) and 6(b) show one embodiment of the adhesive tape application tool of the present invention, describing still another example in which the tool is used, with the area other than the guide roller being omitted for convenience of explanation, wherein FIG. 6(a) is a drawing viewing the cross-section of an adherend and FIG. 6(b) is a drawing viewing the back of the adherend.

FIGS. 7(a) and 7(b) show an example in which a conventional tool is used, with the parts other than guide roller being omitted for convenience of explanation, wherein FIG. 7(a) is a drawing viewing the cross-section of an adherend and FIG. 7(b) is a drawing viewing the back of the adherend.

FIGS. 10(a) to 10(d) show an embodiment of a guide roller having a tapered shape portion being usable in the adhesive tape application tool of the present invention, wherein FIGS. 10(a) to 10(d) are side views with the top upward.

DETAILED DESCRIPTION OF THE INVENTION

Preferred embodiments of the adhesive tape application tool of the present invention (hereinafter sometimes referred to simply as "tool") will now be described.

In the present invention, a guide roller having a tapered shape portion refers to a roller having a concave groove with a configuration of a rib formed therein and projected line portions protruding from the bottom surface of the groove provided coaxially with a concave groove, with the projected line portion on one side of the roller having been removed.

Figure 9:
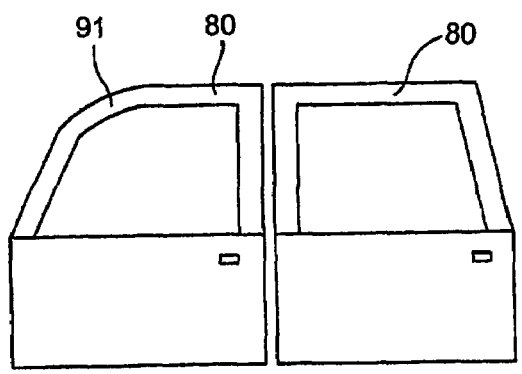
FIG. 9 is a partial side view of a vehicle describing a door sash frame which is an example of the adherend.

The adhesive tape application tool of the present invention is a tool for applying a long adhesive tape to an adherend having a long application surface and a projected line portion formed on the back of the application surface in the longitudinal direction of the application surface, quickly without causing bubbles incorporated or without deviation of tape application position. A door sash frame 80 of a vehicle shown in FIG. 9 will be described as a specific example of the adherend.

Figure 8:
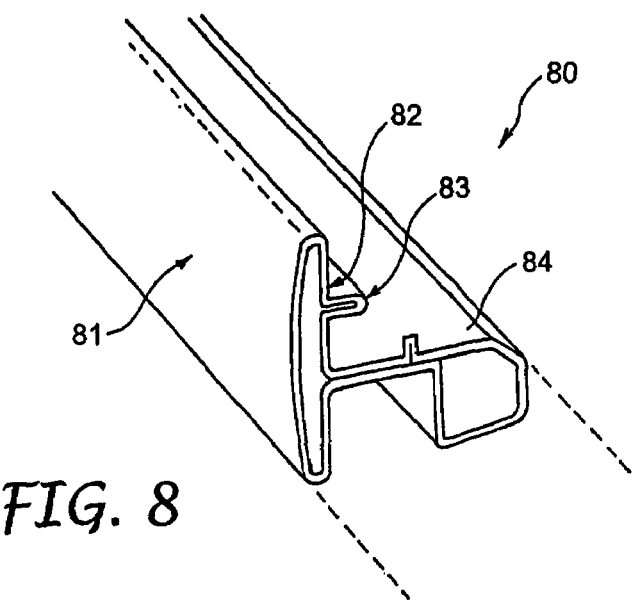
FIG. 8 is a perspective view showing a part of cross-section of an example of adherend.

A door sash frame 80 generally has a cross-section as shown in FIG. 8. An adhesive tape is applied to an application surface 81 which can be seen from outside in substitution for coating. A weather strip is attached to the back surface 82 which is on the opposite side of the application surface 81 of the door sash frame 80. A projected line portion 83 is formed on the back surface 82 of the door sash frame 80 as a rib for securing the weather strip. As shown in the FIG. 9, the door sash frame 80 has a part formed by a straight line and a part formed from a curve (curved part 91). Conventionally, it has been difficult to apply an adhesive tape easily, quickly, beautifully, and precisely to the curved part 91 of the application surface 81. The present invention has solved this problem.

Figure 1:
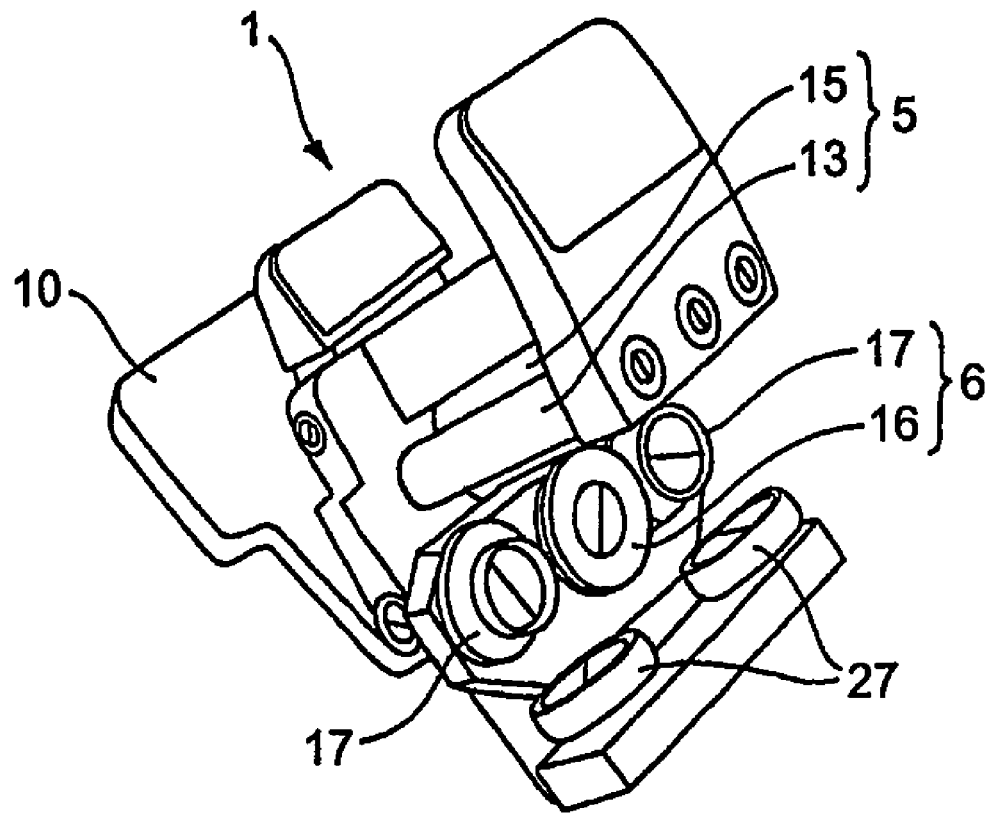
FIG. 1 is a perspective view showing one embodiment of the adhesive tape application tool of the present invention.

FIG. 1 is a perspective view showing one embodiment of the adhesive tape application tool of the present invention. The adhesive tape application tool 1 has an application part 5 comprising a tape guidance roller 13 and a press roller 15 to cause an adhesive tape to adhere to the application surface 81 of the door sash frame 80, shown in FIGS. 8 and 9, for example, and a guidance part 6 comprising guide rollers having a tapered shape portion 16 and 17, which is in contact with the projected line portion 83 of the application surface 81 to hold the application surface 81 together with the application part 5 and guides the tool along the projected line portion 83. The guidance part 6 is provided with the guide rollers 17 having a tapered shape portion positioned at both ends being installed with the top directed in one direction and the central guide roller having a tapered shape portion 16 being installed with the top directed in the other direction. In addition, two auxiliary rollers 27 are provided in contact with an application part for the weather strip of the door sash frame 80 and pinch the adhesive tape application tool 1. When the adhesive tape application tool 1 moves along the projected line portion 83, the auxiliary roller 27 rotates, thereby contributing to stabilization of the adhesive tape application tool 1 when moving.

As shown in this adhesive tape application tool 1, the present invention is characterized in that the guide rollers having a tapered shape portion are installed at both ends and the other guide roller having a tapered shape portion is installed in the opposite directions each other. The guide roller having a tapered shape portion other than those at both ends is preferably installed swingably in the direction of the central axis.

Figure 7B:
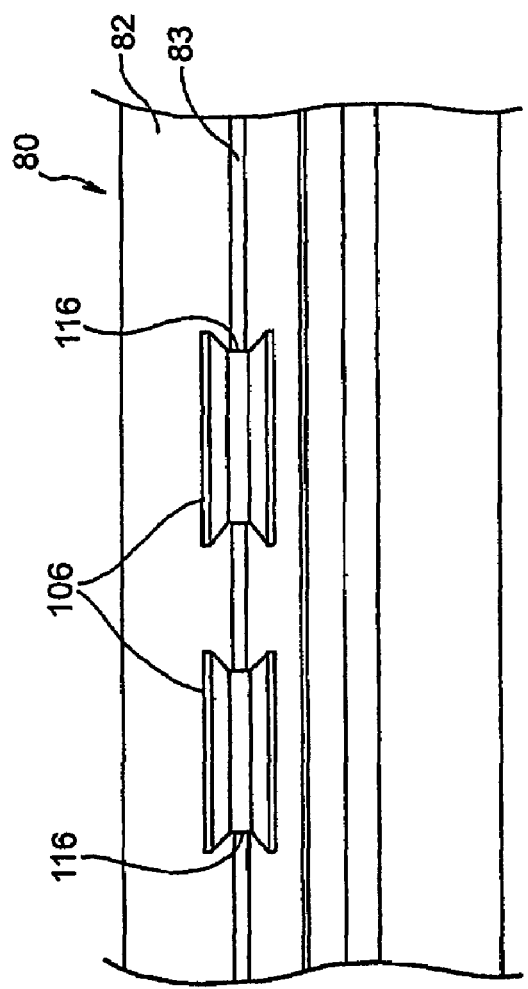
Figure 7A:
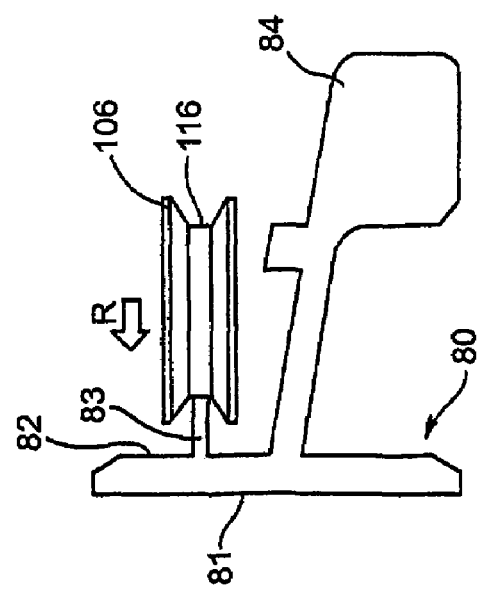

This feature will now be described in comparison with a conventional tool with reference to FIGS. 6(a), 6(b), 7(a) and 7(b). FIG. 6(a), 6(b) show the manner in which the guide rollers having a tapered shape portion 16, 17 come in contact with the projected line portion 83 of the door sash frame 80 in the case where the adhesive tape application tool 1 of the present invention is used. Parts of the tool other than the guide rollers are omitted. FIG. 6(a) is a drawing of the guide roller having a tapered shape portion 16 and the door sash frame 80 viewed from the direction facing the cross-section of the door sash frame 80, and FIG. 6(b) is a similar drawing viewed from the direction facing the back surface 82 of the door sash frame 80. In the same manner, FIGS. 7(a), 7(b) show the manner in which the guide roller 106 with concave grooves 116 comes in contact with the projected line portion 83 of the door sash frame 80 in the case where a conventional tool equipped with a guide roller 106 with concave grooves 116 is used. Parts of the tool other than the guide roller are omitted. FIG. 7(a) is a drawing viewed from the direction facing the cross-section of the door sash frame 80, and FIG. 7(b) is a similar drawing viewed from the direction facing the back surface 82 of the door sash frame 80. In both the adhesive tape application tool 1 of the present invention and the conventional tool, the guide roller is pressed with resilience to the direction in which it is contact with the projected line portion (the direction indicated by the arrow R in the drawings) by a means which is not shown in the drawings.

In the conventional tool, as can be understood from FIG. 7(a), the concave groove 116 of the guide roller 106 engages the projected line portion 83 of the door sash frame 80 so that the guide roller 106 can move along of the projected line portion 83, thereby guiding the entire tool. Therefore, when the projected line portion 83 is straight as shown in FIG. 7(b), the concave groove 116 is in contact with the projected line portion 83 and the guide roller 106 can smoothly move along the projected line portion 83. However, when the projected line portion 83 curves, the direction of the concave groove 116 of the guide roller 106 does not coincide with the direction of the projected line portion 83. The projected line portion 83 cannot be in contact with the bottom of the concave groove 116, but floats, thereby hindering stable running of the guide roller 106. When the projected line portion 83 has a small radius curve, the guide roller 106 sometimes runs off the projected line portion 83.

Such a problem can be obviated by using the tool of the present invention. In the adhesive tape application tool 1 of the present invention, guide rollers having a tapered shape portion which forms a slope from the bottom toward the top are used as a guide roller of the guidance part 6 being in contact with the projected line portion 83 instead of conventional guide rollers with a concave groove. In the adhesive tape application tool 1 of the present invention, one guide roller having a tapered shape portion does not engage the projected line portion. Even if this guide roller having a tapered shape portion is pressed toward the direction shown by the arrow R in FIG. 6(a), the guide roller only suppresses deflection of the door sash frame in the downward direction, i.e. the direction to the bottom of the guide roller having a tapered shape portion in FIG. 6(a), for example (in other words, deflection to the opposite side or to the top of the guide roller having a tapered shape portion, as the tool itself The tool cannot move along the projected line portion 83 in a stable manner using only one guide roller having a tapered shape portion.

As shown in FIG. 6(b), the guidance part 6 is provided with the guide rollers having a tapered shape portion 16, 17. The guide rollers having a tapered shape portion 17 positioned at both ends are installed with the top directed in one direction (downward in the drawing) and the central guide roller 16 having a tapered shape portion is installed with the top directed in the other direction (upward in the drawing). This configuration ensures that fluctuation of the door sash frame 80 provided with the projected line portion 83 and the adhesive tape application tool 1 provided with the guide rollers having a tapered shape portion 16, 17 in the vertical direction shown in FIG. 6(b) is suppressed by means of the three guide rollers having a tapered shape portion 16, 17 in both the area where the projected line portion is straight and the area where the projected line portion curves, whereby the adhesive tape application tool 1 can smoothly and consistently move along the projected line portion.

Providing only two guide rollers having a tapered shape portion facing in opposite directions is not desirable because it is difficult to ensure straight run stability with this configuration. On the other hand, in the case where the tool has four guide rollers having a tapered shape portion, for example, when the guide rollers having a tapered shape portion positioned at both ends and two guide rollers having a tapered shape portion positioned therebetween are installed facing in opposite directions, the guide rollers having a tapered shape portion cannot be adequately operated in a curve and may run off the grooves as in the case of conventional tools, although straight run stability may be improved.

In the adhesive tape application tool 1 of the present invention, it is preferable that the central guide roller having a tapered shape portion 16 be installed swingably to the direction of the center axis, i.e. the direction of the arrow S in FIG. 6(b). In other words, the central guide roller having a tapered shape portion 16 is preferably installed with a certain allowance. This configuration can improve operability at a curve. Even if the door sash has the form of a curve with a small radius or steeply curves at a corner, the adhesive tape application tool 1 can move steadily, with the guide rollers having a tapered shape portions 16, 17 maintaining contact with the projected line portion 83.

Figure 4:
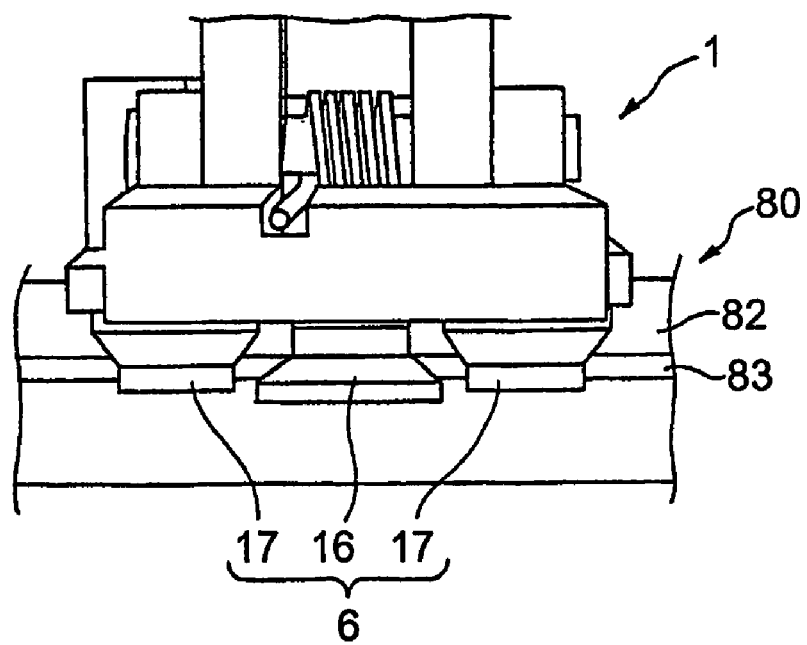
FIG. 4 shows an embodiment of the adhesive tape application tool of the present invention and describes one example of the manner in which the tool is used, with the auxiliary roller area being omitted for convenience of explanation.
Figure 5:
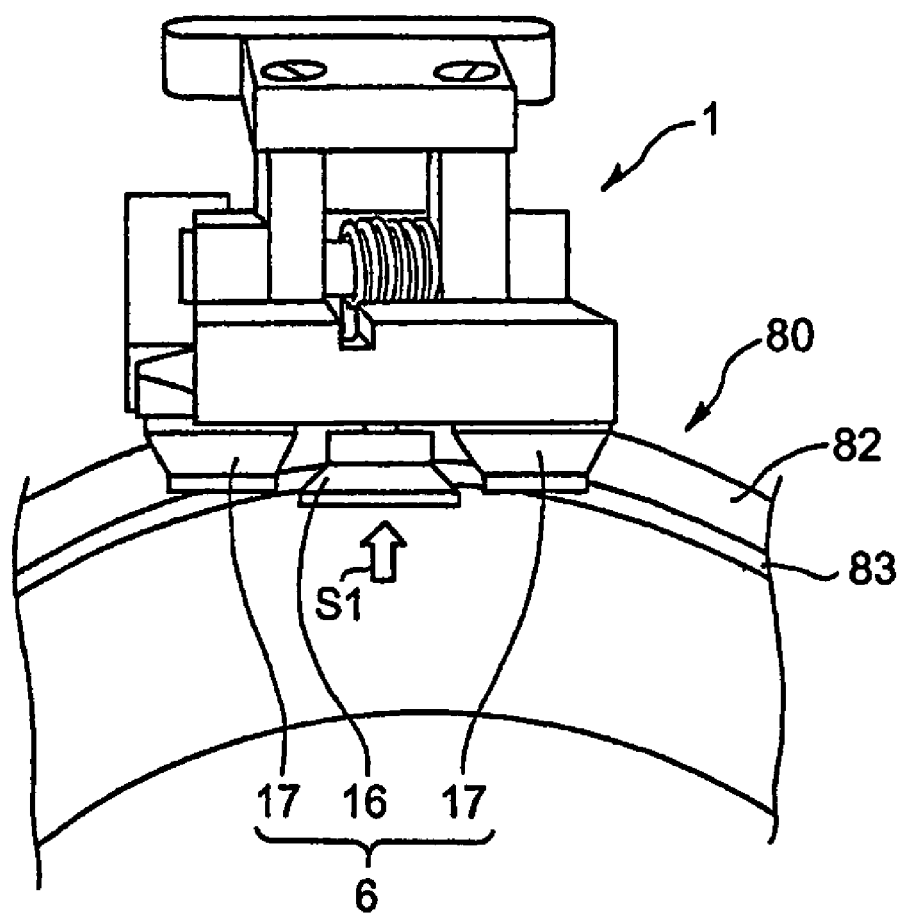
FIG. 5 shows another embodiment of the adhesive tape application tool of the present invention and describes another example of the manner in which the tool is used, with the auxiliary roller area being omitted for convenience of explanation.

For example, when applying a tape to a door sash frame 80 using the adhesive tape application tool 1 of the present invention, the central guide roller having a tapered shape portion 16 moves upward along the center axis (the S1 direction in the Figure) when the tool travels from the area where the projected line portion 83 is straight as shown in the FIG. 4 to the area where the projected line portion 83 curves as shown in the FIG. 5. This configuration ensures that the guide rollers having a tapered shape portion 16, 17 maintain contact with the projected line portion 83 and the adhesive tape application tool 1 steadily moves along the projected line portion 83.

In the adhesive tape application tool 1 of the present invention shown in FIGS. 4, 5, and 6(b), the guide rollers having a tapered shape portion are installed so that the direction from the bottom to the top is in the order of downward, upward, and downward. The present invention is not limited to this embodiment. The adhesive tape application tool 1 of this configuration is an embodiment allowing the projected line portion to curve to the right (the direction shown by the projected line portion 83 in FIG. 5). If the tool is to be designed to allow the projected line portion to curve in the opposite direction, the guide rollers having a tapered shape portion should be installed so that the direction from the bottom to the top is in the order of upward, downward, and upward.

Figure 10A:
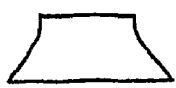
Figure 10B:
Figure 10C:
Figure 10D:
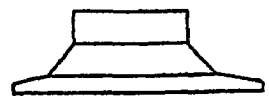

There are no limitations to the guide rollers having a tapered shape portion in the present invention. Any guide roller with a preferable mountain like shape, i.e. a shape whereby the slope of horizontal sectional area decreases from the bottom to the top, may be selected according to the curve drawn by the projected line portion. Rollers having a tapered shape portion of which the side views are shown in FIGS. 10(a) to 10(d) can be given as examples. FIG. 10(a) shows an almost truncated cone-shape guide roller having a tapered shape portion. FIG. 10(b) shows a guide roller having a tapered shape portion with a cylinder mounted on a truncated cone (the same type as those shown in FIGS. 6(a), 6(b). The guide roller having a tapered shape portion shown in FIG. 10(c) comprises a cylinder mounted on a truncated cone similar to that shown in FIG. 10(b). A projected line portion protrudes from a groove bottom having the same axis with a rib-shaped concave groove with a form of a flange and the truncated cone slopes gradually. The guide roller having a tapered shape portion shown in FIG. 10(d) comprises a flange and a truncated cone with a gradual slope in the same manner as that shown in FIG. 10(c). The inside of the flange, i.e. the bottom of the groove, is thin around the circumference, but gradually becomes thick toward the axis up to the point where a cylinder is mounted on the truncated cone, with the inner side (axial side) of the cylinder having a uniform thickness.

The entire adhesive tape application tool of the present invention including the above-described features will be explained with reference to the drawings.

Figure 2A:
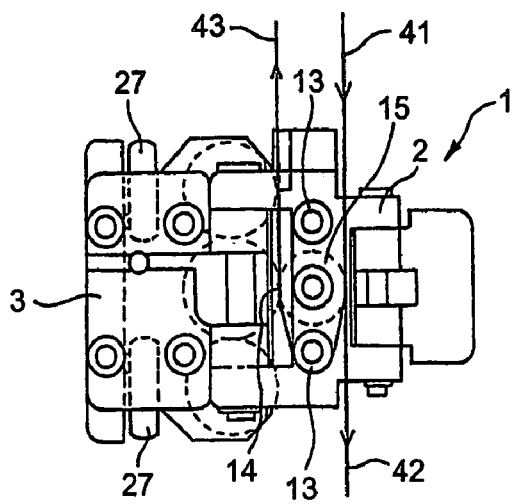
Figure 2B:
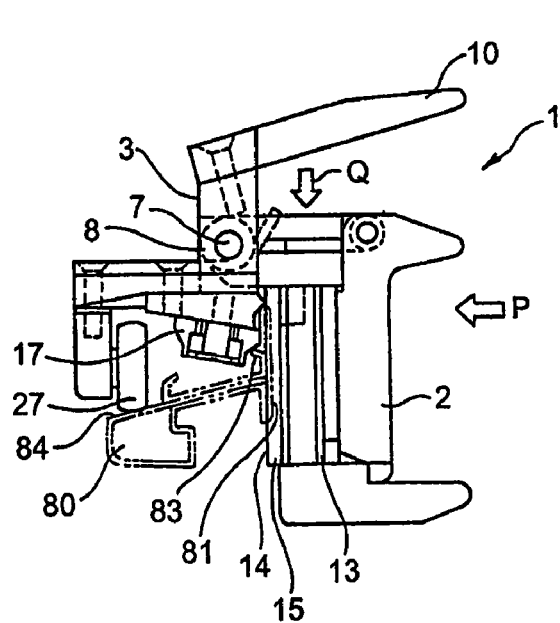
Figure 2C:
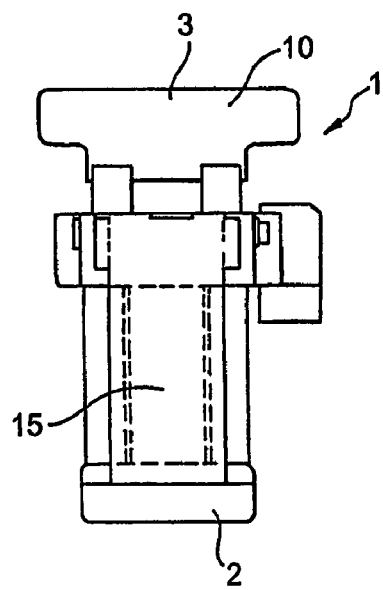
Figure 3:
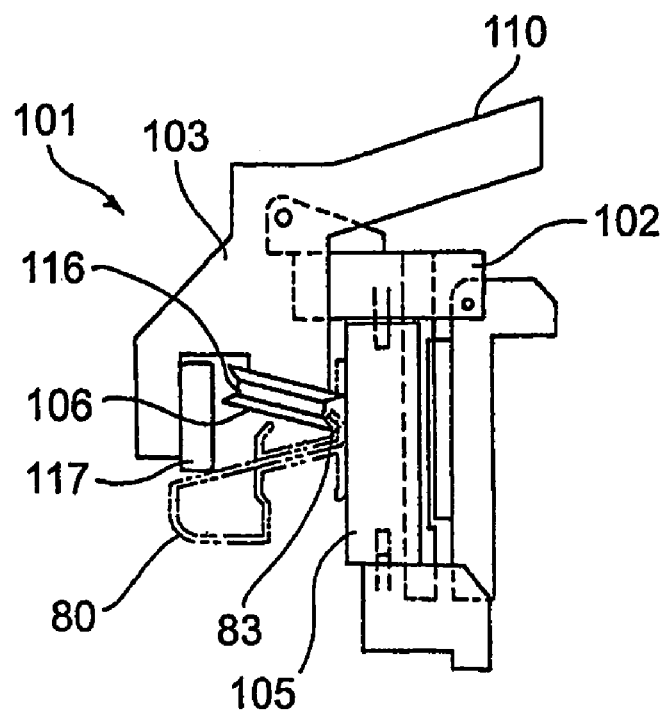
FIG. 3 is a side view of a conventional tool.

FIGS. 2(a) to 2(c) show one embodiment of the adhesive tape application tool 1 of the present invention, wherein FIG. 2(a) is a top view seen from the arrow Q in FIG. 2(b) from which a lever is omitted, FIG. 2(b) is a side view, and FIG. 2(c) is a front view viewed from the arrow P of FIG. 2(b).

The adhesive tape application tool 1 mainly comprises a first support member 2 and a second support member 3. The first support member 2 has an application part 5, which comprises a tape guide roller 13 to introduce an adhesive tape smoothly into the tool and discharge a delamination liner, and a press roller 15 to press the adhesive tape against the application surface of an adherend (for example, a door sash frame 80 shown in FIG. 2(b)). The tape guide roller 13 and press roller 15 are axially mounted on the first support member 2. Of these, at least the press roller 15 must be rotatably mounted. The second support member 3 has a guidance part 6 comprises guide rollers having a tapered shape portion 16, 17, and the guide rollers having a tapered shape portion 16, 17 are axially pinched by means of the second support member 3. The first support member 2 and the second support member 3 are retractably supported coaxial with a shaft 7. A coil spring 8 acting to close the first support member 2 and the second support member 3 is inserted in the shaft 7. The press roller 15 of the application part 5 provided in the first support member 2 and the guide rollers having a tapered shape portion 16, 17 of the guide part 6 provided in the second support member 3 approach each other through the action of the coil spring 8 to pinch the door sash frame 80 from both sides.

As can be understood from FIG. 2(a), two tape guide rollers 13 are coaxially attached on both sides of the press roller 15 in the first support member 2. Using the tape guide roller 13, not only it is possible to separate an adhesive tape 41 from the delamination liner 42 and guide it to the press side 14 of the press roller 15, but also it is possible to regulate deviation of the tape in the width direction and to steadily send the adhesive tape 41 to the press roller 15. The adhesive tape 41 is sent along the surface of the press roller 15. When the transfer route of the adhesive tape 41 is reversed by the tape guide roller 13, the delamination liner 42 comes off the film and adhesive layer 43 and, at the same time, the film and the adhesive layer 43 are pressed against the application surface of the door sash frame 80 by the pressing side 14 of the press roller 15.

In addition to the guide rollers having a tapered shape portion 16, 17, it is desirable that the second support member 3 be provided with an auxiliary roller 27 which comes in contact with a weather strip application part 84 projecting from the back of the door sash frame 80. Contact of the auxiliary roller 27 with the weather strip application part 84 of the door sash frame 80 ensures that the adhesive tape application tool 1 is attached to the door sash frame 80 so that the adhesive tape application tool 1 is prevented from swinging when an adhesive tape is applied, thereby improving stability of the adhesive tape application tool 1.

A method of using the adhesive tape application tool of the present invention will be described with reference to FIGS. 2(a) to 2(c). Conventionally known adhesive tape can be used as the adhesive tape 41.

First, an adhesive tape 41 is caused to pass through the opposite side of the door sash frame 80 of a first tape guide roller 13 so that the delamination liner 42 does not face the press roller 15. Next, the adhesive tape 41 is caused to pass through the side opposite to the press side 14 of the press roller 15 to reverse along a second tape guide roller 13. Then, the adhesive tape 41 is sent to the press side 14 of the press roller 15. If part of the delamination liner 42 of the adhesive tape 41 is peeled off when reversing the adhesive tape 41, the delamination liner 42 can be removed from the adhesive layer 43 without going to the direction of the press roller 15 (FIG. 2(a)). Then, only the film and adhesive layer 43 is sent to the pressing side 14 of the press roller 15, and the adhesive layer of the film and adhesive layer 43 becomes exposed on the application surface side of the door sash frame 80.

In this state, the first support member 2 and the second support member 3 are opened by the operation of the lever 10. Then, as shown in FIG. 2(b), the first support member 2 and the second support member 3 are closed by the operation of the lever 10 so that the door sash frame 80 may be pinched by the guide rollers having a tapered shape portion 16, 17 and the press roller 15 from both sides, with the guide rollers having a tapered shape portion 16, 17 (only the guide roller having a tapered shape portion 17 is shown in the Figure) maintaining contact with the projected line portion 83 of the door sash frame 80. In this manner, the adhesive tape application tool 1 is set on the door sash frame 80, and the film and adhesive layer 43 of the adhesive tape 41 is pressed against the application surface 81 of the door sash frame 80 by the pressing side 14 of the press roller 15.

When this state is attained, the adhesive tape application tool 1 is caused to move along the door sash frame 80, thereby causing the adhesive tape 41 to move. Only the film and adhesive layer 43 is applied to the application surface of the door sash frame 80, with the delamination liner 42 being separated from the adhesive tape 41.

The adhesive tape application tool 1 of the present invention is provided with a first support member 2 and a second support member 3 coaxially supported, a coil spring 8 working to close both the support members 2, 3, and a lever 10 working to open both support members 2, 3 resisting the coil spring 8. The first and second support members 2, 3 are opened and closed by operating the lever 10, whereby an adherend can be quickly pinched by both support members 2, 3 of the adhesive tape application tool 1.

In addition, using the adhesive tape application tool 1 of the present invention an adhesive tape 41 can be applied to an adherend by pressing the adhesive tape 41 to the adherend by a press roller 15 formed from a resilient material. Therefore, the adhesive tape 41 is not easily damaged, nor do bubbles tend to remain between the adherend and the adhesive tape 41.

Furthermore, the adhesive tape application tool 1 of the present invention is provided with three guide rollers having a tapered shape portion 16, 17, in which those at both ends are installed with the top directed in one direction and the other one in the center is installed with the top directed in the other direction. The projected line portion of the adherend, therefore, is not engaged by one guide roller, but by a combination of three guide rollers having a tapered shape portion 16, 17. This configuration prevents the adhesive tape application tool 1 from swinging in the vertical direction and ensures stable and smooth movement of the adhesive tape application tool 1 in the areas where the projected line portion is formed straight or curved.

Material used for forming the adhesive tape application tool of the present invention will now be described. An adhesive tape application tool is a fixture which users operate by hand to apply an adhesive tape. This object of use requires the adhesive tape application tool to be light to the extent that the device does not provide pain during use over a long period of time. Also, the tool must be strong enough to resist the stress applied when one applies an adhesive tape to an application surface. In addition, the application part must be resilient to cause the adhesive tape to securely stick to the application surface. The material must maintain such resilience for a long period of time. There are no limitations to the material for the adhesive tape application tool inasmuch as these conditions are satisfied. For example, the following materials can be employed.

Rubber materials such as natural rubber and synthetic rubber, foamed plastic materials such as foamed polyurethane, and various types of felt, and the like are preferably used for the press roller for the application part. Parts other than the press roller may be made from plastics such as polypropylene resin, polyethylene resin, polyacetal resin, ABS resin, nylon resin, acrylic resin, various types of fluorine-containing resin, metals such as aluminum and iron, and alloys of such metals. Especially, hard-type or soft-type plastic materials are preferable materials for the guide roller of the guide part.

As can be understood from the above description, the adhesive tape application tool can quickly apply an adhesive tape to an adherend even if the surface of the adherend has a shape with a curve or the surface curves steeply with a corner, without incorporating bubbles or causing the tape adhesion position to deviate. While the preceding disclosure has specifically referred to the applicability of the present invention to automotive type vehicles, it is understood that the present invention may also be applicable to being used with other types of vehicles (e.g., aircraft, water vessels, etc.) and other adherends.

I claim:

1. An adhesive tape application tool for applying an adhesive tape to an adherend having a side comprising an application surface and a projected line portion formed on a side of the adherend opposite the side comprising the application surface, said adhesive tape application tool comprising an application part for pressing an adhesive tape against the application surface and a guidance part comprising first and second guide rollers, said first guide roller comprising a first end having a first diameter, a second end having a second diameter smaller than said first diameter and a tapered portion located between said first and second ends and said second guide roller comprising a first end having a first diameter, a second diameter smaller than said first diameter and a tapered portion located between said first and second diameters, said first and second guide rollers having axes of rotation which are not perpendicular to a longitudinal axis of said application part, and said tool being operatively adapted so that said first and second guide rollers contact the projected line portion, wherein the first end of said first guide roller is located on a first side of the projected line portion, the second end of said first guide roller is located beyond the first side of the projected line portion, the first end of said second guide roller is located on a second side of the projected line portion, a second end of said second guide roller is located beyond the second side of the projected line portion, and the first side of the projected line portion is opposite to the second side of the projected line portion.

2. The adhesive tape application tool according to claim 1, wherein said second guide roller is rotatable around a central axis and movable along the direction of said central axis.

3. The adhesive tape application tool according to claim 2, wherein the adherend can be pinched with resilience by said application part and guidance part, and said tool further comprises opening and closing structure to disengage said application part and guidance part from the adherend.

4. The adhesive tape application tool according to claim 2, wherein the adherend can be pinched with resilience by said application part and guidance part, and said application part and guidance part can be opened so as to be disengaged from the adherend.

5. The adhesive tape application tool according to claim 1, wherein the adherend can be pinched with resilience by said application part and guidance part, and said tool further comprises opening and closing structure to disengage said application part and guidance part from the adherend.

6. The adhesive tape application tool according to claim 1, wherein the adherend can be pinched with resilience by said application part and guidance part, and said application part and guidance part can be opened so as to be disengaged from the adherend.

7. The adhesive tape application tool according to claim 1, wherein said second guide roller comprises a second end having said second diameter.

8. The adhesive tape application tool according to claim 1, wherein said guidance part further comprises a third guide roller comprising a first end having a first diameter, a second end having a second diameter smaller than said first diameter and a tapered portion located between said first and second ends, said third guide roller is oriented such that its first end is located on the first side of the projected line portion, and said second guide roller is located between said first and third guide rollers.

9. The adhesive tape application tool according to claim 1, wherein said first roller further comprises a cylindrical portion located together with said tapered portion between said first and second ends.

10. The adhesive tape application tool according to claim 1, wherein said tapered portion of said first roller comprises a frustoconical shape.

11. An adhesive tape application tool for applying an adhesive tape to an adherend having a side comprising an application surface and a projected line portion formed on a side of the adherend opposite the side comprising the application surface, said adhesive tape application tool comprising an application part for pressing an adhesive tape against the application surface and a guidance part comprising first and second rollers adapted to contact the projected line portion of the adherend during at least a portion of movement of said tool along the adherend, said first and second rollers having tapered portions oriented in opposing directions and contacting opposite sides of the projected line portion of the adherend, said tapered portion of each of said first and second rollers extending from a first end toward a second end smaller than said first end, wherein each of said first and second rollers having an axis of rotation which is not perpendicular to a longitudinal axis of said application part, wherein the first end of said first roller is located on a first side of the projected line portion, the second end of said first roller is located beyond the first side of the projected line portion, the first end of said second roller is located on a second side of the projected line portion, the second end of said second roller is located beyond the second side of the projected line portion, and the first side of the projected line portion is opposite to the second side of the projected line portion.

12. The adhesive tape application tool according to claim 11, wherein said tapered portion of said first roller contacts only a first side of the projected line portion of the adherend and said tapered portion of said second roller contacts only a second side of the projected line portion of the adherend.

13. The adhesive tape application tool according to claim 11, wherein said guidance part further comprises a third element, said third element having a tapered portion oriented in the same direction as the tapered portion of said first roller and being adapted to contact the first side of the projected line portion of the adherend during at least a portion of the movement of said tool along the adherend, with said second roller being located between said first roller and said third element.

14. The adhesive tape application tool according to claim 13, wherein said third element comprises a third roller.

15. The adhesive tape application tool according to claim 11, wherein said first roller comprises a first end having a first diameter, a second end having a second diameter smaller than the first diameter and an intermediate portion located between said first and second ends defining said tapered portion.

16. The adhesive tape application tool according to claim 15, wherein said first roller further comprises a cylindrical portion located together with said tapered portion between said first and second ends.

* * * * *